Aug. 9, 1927. 1,638,231
T. P. ARCHER ET AL
COMBINATION REMOTE CONTROL AND PULL-TO HANDLE ASSEMBLY
Filed Feb. 11, 1926 2 Sheets-Sheet 1
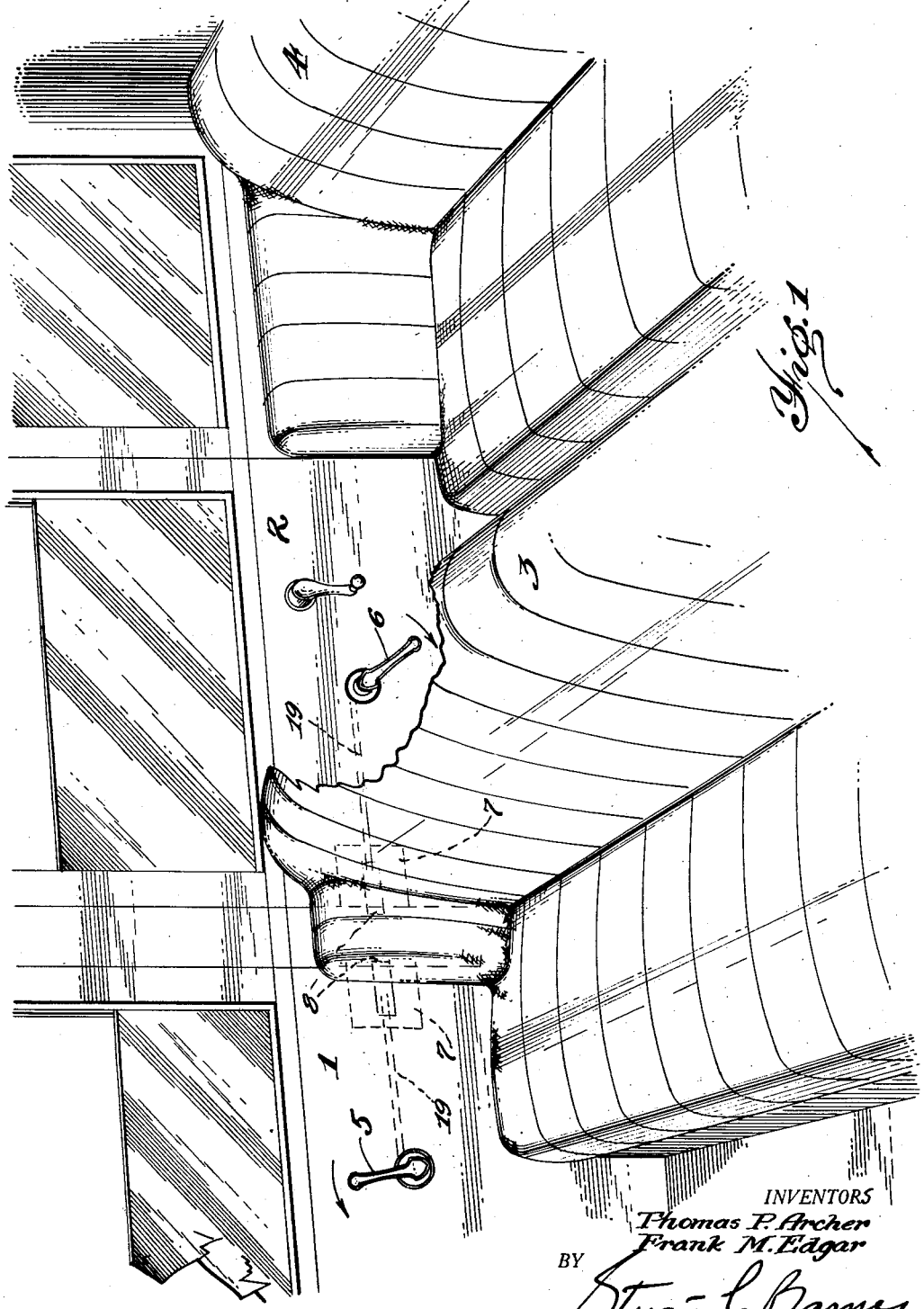
INVENTORS
Thomas P. Archer
Frank M. Edgar
BY
ATTORNEY.

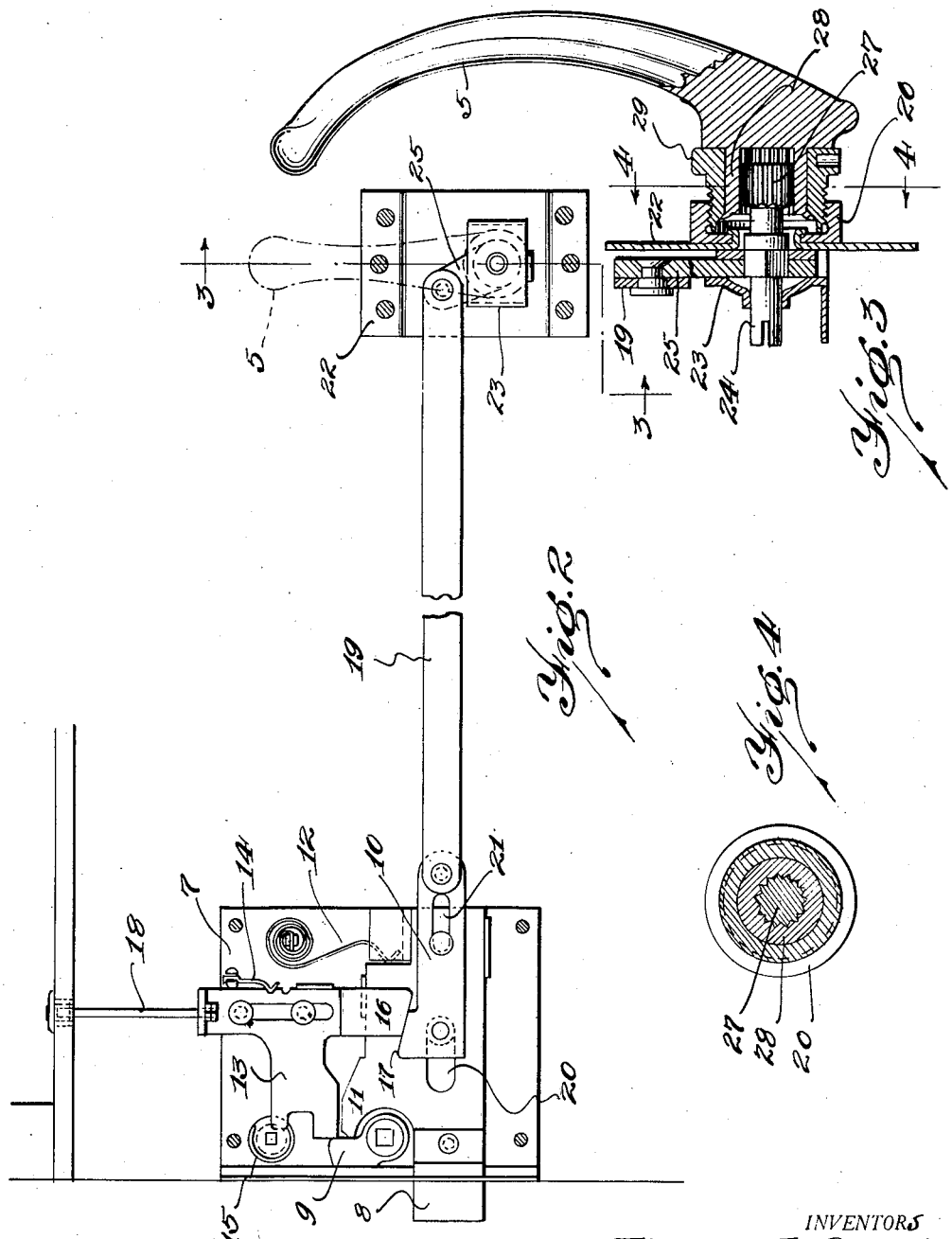

Patented Aug. 9, 1927.

1,638,231

UNITED STATES PATENT OFFICE.

THOMAS P. ARCHER AND FRANK M. EDGAR, OF DETROIT, MICHIGAN, ASSIGNORS TO TERNSTEDT MANUFACTURING COMPANY, OF DETROIT, MICHIGAN, A CORPORATION OF MICHIGAN.

COMBINATION REMOTE CONTROL AND PULL-TO HANDLE ASSEMBLY.

Application filed February 11, 1926. Serial No. 87,571.

This invention relates broadly to automobile body construction, and more particularly to combined pull-to and remote lock control handles and the arranging thereof in combination with the automobile body.

Heretofore in automobile body construction it has been customary to provide either a swinging lever or a rotating vertical spindle to retract the latch bolt from the inside. The location of such inside operating structures usually makes it very unhandy for the occupant of the car, and particularly those sitting in the rear seat, to reach the retracting levers. Furthermore, it has been necessary in utilizing inside retracting means of the type described to accompany such handles with an additional pull-to handle so that one may release the latch bolt with one hand and swing the door with the other hand. It very frequently happens that the person operating the door will move the lever or operate the spindle to open the door from the inside, and as the door is moving outward, make an attempt to grip the pull-to handle and miss the same. This often results in damage to the door or hinges.

We have met and solved the problem of operating doors from the inside of an automobile body in a different way. Instead of utilizing a retracting means and an additional pull-to means the latch bolt lever and pull-to handle are combined in one piece of art hardware. Furthermore, this combined pull-to and latch bolt control handle is located at a point remote from the latch fixture whereby it can be easily and effectively grasped by the occupants of the car with a minimum amount of effort.

This novel arrangement not only overcomes the difficulty of the known prior art by providing a single remote control means for both retracting the latch and opening and closing the door, but the device, in addition, contemplates a novel combination assembly between the inside retractor lever and the remote control means, whereby the retractor lever may be positioned at any point desired so that it will present a lever which is not only readily accessible to the occupants of the car, but which may be gripped and operated with a minimum amount of effort. Thus the inside pull-to retractor levers on each of the doors may, if desired, be positioned at a different angle so as not to cause any inconvenience to the occupants of the car, and at the same time such levers may be positioned whereby they will be obviously moved in their proper direction by the occupant of either seat.

This application is a continuation, in part, of our prior application, No. 46,829, filed July 29, 1925.

In the drawings:

Fig. 1 is an inside view of a closed body showing the novel remote control pull-to levers in two different positions as applied to the front and rear doors.

Fig. 2 is an elevation of a preferred form of latch assembly embodying this invention and illustrating the manner of connecting the lock fixture and remote control fixture.

Fig. 3 is a vertical section taken on the line 3—3 of Fig. 2, illustrating the novel manner of connecting the inside pull-to and operating handle to the operating stud of the remote control fixture.

Fig. 4 is a detail section taken on the line 4—4 of Fig. 3 and showing the complemental relation between the serrations on the operating stud and the operating lever.

Referring to the drawings which disclose one embodiment of this invention, and with particular reference to Fig. 1, 1 designates the front door of a closed sedan, and 2 the rear door. The front and rear seats are designated 3 and 4, respectively. The doors as shown, are hinged according to general standard construction, that is the front door swings rearwardly and the rear door swings forwardly. Regardless of the mechanical advantages, the pleasing appearance given to the interior of the automobile body by our novel combination of elements is apparent from Fig. 1, wherein the customary pivoted or swinging latch operating handles and separate pull-to handles are done away with. In Fig. 1 the combined pull-to and latch operating handle for the front door may be designated 5, and is shown positioned centrally of the door where it can be readily reached by the occupant of the front seat. The position of the lock fixture and the connecting means between the lever 5 and such fixture is shown in dotted lines. The inside operating lever for the rear door may be designated 6 and is also shown in Fig. 1 as being located approximately centrally of the rear door in a position so as not to interfere with the window regulator handle, and at the same time being readily accessible to occupants of either the front or rear seats.

The latch fixture and the remote control fixture which may be utilized in carrying out this invention, are illustrated in detail in Fig. 2, where the latch casing may be designated 7. A bolt 8 is slidably supported in this casing and is designed to be retracted by a roll-back 9 connected to the outside handle or by a reciprocable plate 10, slidably mounted on the bolt and actuated from the inside of the door, as will be presently described. The roll-back 9, when it is free to operate, contacts with an extension 11, forming a part of the bolt 8. Such bolt 8 is normally held in a projected position by coil spring 12, mounted on the latch casing.

In the structure illustrated, the roll-back 9 is adapted to be locked by vertical reciprocable plate 13, which is slidably mounted on the latch casing and which is preferably held in operative and inoperative position by the engagement of a spring 14 with suitable notches on the edge of the plate. The plate 13 may be raised or lowered by suitable lock spindle 15, actuated by means of the key from the outside of the door. The lower end of the plate 13 is provided with a projection 16 which overlaps the rear of the bolt 8 to retain the same in sliding position with the latch casing. The lower end of this extension 16 is provided with a cam surface which is designed to be engaged by a suitable cam surface on the plate 10. Thus the rearward movement of the plate 10 will raise the plate 13 to inoperative position in addition to retracting the bolt 8. The plate 13 may be pushed into locking position from the inside of the door by any suitable means such as the rod 18 connected with the plate and extending up through the garnish moulding of the door.

The retractor plate 10 is connected to the remote control fixture by means of the connecting rod 19. Lost motion between the rod 19 and the bolt 8 is obtained by means of elongated slots 20 and 21 provided respectively in the bolt 8 and the plate 10. The remote control fixture comprises a plate 22, having secured thereto a housing 23, such plate housing forming bearings for an operating stud 24. An actuator arm 25 is securely mounted on said stud 24 and pivotally connected to one end of the rod 19. The plate 22 is preferably struck up to receive and secure an internally threaded nut 26. The inner end of the stud 24 which is supported by the plate 22 and housing 23, and carries the operative lever 25, is provided with an upset serrated part 27. These serrations are relatively small so as to present a large number of separate serrations or teeth around the circumference of the stud.

The inside remote control lever handles, designated 5 and 6 in Fig. 1, are preferably of the shape shown in Fig. 3 so as to project a minimum distance inside the door and not serve as a means for catching clothing, and at the same time present a handle which may be firmly gripped so that the door may be easily swung and the latch retracted. This lever handle is provided, as at 28, with an annular extension, the interior walls of which extension are provided with serrations, or internal teeth, for receiving the serrations 27 on the stud 24. The end of the annular extension 28 is preferably spun outwardly or peaned over to rotatably position a nut 29 which nut engages with the receiving nut 26 to force the internal serrations of the handle into complemental relation with the serrations on the operating stud. It will be obvious that inasmuch as the operating stud and lever handle are provided with a large number of small serrations that such handle may be quickly adjusted by initially positioning in any desired position relative to the remote control fixture.

It will be understood that the actuator arm 25 may be normally maintained in the position shown in Fig. 2, bearing against the housing 23, by a suitable coil spring which may be positioned between the slotted end of the stud 24 and an extension in the housing 23 or by a single spring located on the latch fixture and connected to the plate 10. The purpose of such spring is to prevent rattling of the remote control means and connecting fixtures, and does not form a part of the present invention.

It will thus be seen that by provision of a remote control lever, which includes in combination a pull-to lever, a remote control fixture for retracting the latch and novel means between the lever and remote control fixture whereby the lever may be positioned in any one of a practically innumerable number of positions, we have provided a basically new door control structure for automobile bodies. For instance, referring to the remote control handle for the front door, as shown in Fig. 1, by providing means whereby such handle may be secured at any desired position it is possible to secure the handle as illustrated so that it extends upwardly for forwardly. In this position it is obvious that the handle may be easily reached by the occupant of the right front seat, and it is obvious by so positioning the handle that the person opening the door from the inside would naturally push such handle in a counter clockwise direction to retract the latch. Furthermore, by means of this same adjustability of the pull-to handle in combination with the remote control fixture, the inside lever for the right rear door may be secured in a downwardly and rearwardly extended position. When the pull-to lever is in the position illustrated it is obvious that the person in the rear seat bending slightly forward, would naturally push such handle forwardly to retract the latch bolt, while the occupant of the front seat could easily reach over the back of the front seat and would naturally grip the lever in the position shown and turn it in a clockwise direction to retract the latch bolt. It will further be obvious that the combined pull-to remote control levers may be secured in any desired position so that they may be easily reached to retract the bolt and open the door. Such other handles may also be positioned so as not to interfere with any other fixtures forming part of the automobile body.

In the description we have referred to the latch handle being securable to the remote control fixture "in a relatively large number of positions", and in some of the claims similar statements have been made. It will be obvious that it is not practical, nor prudent, to designate the exact number of positions. The meaning intended to be incurred is that the handle may be attached to its hub in successive positions remote from each other by relatively small angles considerably less than 90 degrees, which is the usual practice in mounting a handle on its hub.

What we claim is:

1. In combination with an automobile body construction of the closed type, having one or more doors hinged to a post and closing by a latch against another post, and one or more seats positioned adjacent to said door or doors, a remote control fixture secured to the door or doors at a point remote from the latch, an operating connection between the fixture and the latch, and a handle positioned on the inside of the door to be readily accessible to the occupant of said seat or seats, and secured to said remote control fixture for retracting the latch bolt by a short movement, said handle being securable to said remote control fixture in a relatively large number of positions to get the best location considering conditions on the interior of the body and whereby said door can be easily opened by a small movement of said handle from a position which is selected for the setting of the handle.

2. In combination with an automobile body construction of the type having one or more doors hinged to a post and closing by a latch against another post, and one or more seats positioned adjacent to said door or doors, a control fixture secured to the inside of the door at a point remote from the latch, a connection for operatively connecting said fixture and the latch, and a combined latch operating and pull-to handle secured to said control fixture, said handle being securable to said control fixture in a relatively large number of positions, and positioned relative to said seat or seats to be easily accessible by the occupant thereof, whereby said handle may be grasped from any one of the plurality of positions in which it may be set to retract the latch and may be grasped in any one of such positions as a pull-to to close and latch the door.

3. In combination with an automobile body construction of the type having a door hinged to one post and closing by a latch against another post, and a seat positioned adjacent to said door, a control fixture secured to the inside of the door at a point remote from the latch, said control fixture comprising in part an actuating means provided with a relatively large number of serrations, and a combined pull-to and latch operating handle provided with serrations for complementally engaging the serrations of said actuating means to permit adjustment, and securing of said handle to said fixture in any desired position according to conditions in each case of use, whereby the handle may be conveniently grasped and utilized as a latch retractor or pull-to.

4. In combination with an automobile body construction of the closed type having adjacent doors each hinged to a post and closing by a latch against another post, and seats positioned adjacent to said doors, combined latch operating and pull-to levers each positioned at a transversely remote point from the latch unit on its respective door, one of said levers being secured to its door at a position to be readily accessible to the occupants of a plurality of seats, said levers being adjustable to any position desirable under each particular situation.

5 In combination with an automobile body construction of the closed type having front and rear doors each hinged to a post and closing by a latch against another post, and seats positioned adjacent to said door or doors, a control fixture secured to the inside of each respective door at a point remote from the latch fixture, means for operatively connecting said fixtures and latch units, combined latch actuating and pull-to levers secured to such control fixtures, one of said levers being normally positioned to be readily accessible as a latch operating and pull-to handle to the occupant of one seat and another being secured to its control fixture in a position to permit easy accessibility to the occupant of the adjacent seat, said combined latch actuating and pull-to members being adjustable and adapted to be secured at any desired position.

6. In combination with an automobile body construction of the type having a plurality of doors each hinged to a post and closing by a latch against another post, and seats adjacent said doors, combined latch operating and pull-to levers each secured to a door at a point remote from the latch, connecting means between said remote control means and the latches, the combined latch operating and pull-to member on one door being positioned whereby it may be easily grasped and actuated as a latch retracting or pull-to member by the occupant of the seat on either side of the door, said last-named combined latch retracting and pull-to lever being adjustable and securable to the door in any one of a large number of positions.

7. In combination with an automobile body construction of the type having one or more doors each hinged to a post and closing by a latch against another post, and one or more seats positioned adjacent to said door or doors, a control fixture secured to the inside of the door at a point remote from the latch, a draft connection for operatively connecting said control fixture and the latch, said control fixture being provided with retracting means for moving the draft connection in one direction to retract the latch, and a combined latch operating and pull-to handle secured to the said control fixture, the said handle being securable to the said control fixture in a relatively large number of positions to get the best location considering the location of the seat with respect to the door whereby the handle may be easily grasped and moved in the one desired direction to retract the latch bolt or may be grasped as a stationary pull-to to close and latch the door without affecting the latch bolt.

In testimony whereof we have affixed our signatures.

THOMAS P. ARCHER.
FRANK M. EDGAR.